(12) United States Patent  (10) Patent No.: US 9,156,618 B2
Balsells Mercadé et al.  (45) Date of Patent: Oct. 13, 2015

(54) PLASTIC, MODULAR AND SELF-ENGAGING BRISTLE BRUSH

(71) Applicants: Antonio Balsells Mercadé, Igualada (ES); Santiago Lucas Serra, Igualada (ES)

(72) Inventors: Antonio Balsells Mercadé, Igualada (ES); Santiago Lucas Serra, Igualada (ES)

(73) Assignee: MANUFACTURAS Y TRANSFORMADOS AB, S.L., Igualada (Barcelona) (ES)

( * ) Notice: Subject to any disclaimer, the term of this patent is extended or adjusted under 35 U.S.C. 154(b) by 12 days.

(21) Appl. No.: 13/861,569

(22) Filed: Apr. 12, 2013

(65) Prior Publication Data

US 2013/0270075 A1  Oct. 17, 2013

(30) Foreign Application Priority Data

Apr. 16, 2012  (ES) .................................. 201230568

(51) Int. Cl.
*B65G 15/58* (2006.01)
*B26D 7/20* (2006.01)

(52) U.S. Cl.
CPC . *B65G 15/58* (2013.01); *B26D 7/20* (2013.01)

(58) Field of Classification Search
None
See application file for complete search history.

(56) References Cited

U.S. PATENT DOCUMENTS 3,928,883 A * 12/1975 Gregory et al. ...................... 15/4
4,328,726 A  5/1982 Pearl
5,125,504 A  6/1992 Corlett et al.
5,189,936 A  3/1993 Gerber et al.
5,596,917 A * 1/1997 Gerber et al. ................... 83/152

FOREIGN PATENT DOCUMENTS

| EP | 0 517 143 | 12/1992 |
| EP | 0 542 410 | 5/1993 |
| EP | 654 426 | 5/1995 |
| EP | 1 591 382 | 11/2005 |
| ES | 8 104 965 | 8/1981 |
| ES | 2 074 747 | 9/1995 |
| ES | 2 080 367 | 2/1996 |
| GB | 2 069 181 | 8/1981 |

OTHER PUBLICATIONS

Spanish Search Report dated Oct. 14, 2013 issued in corresponding Spanish Application No. 201230568.
European Search Report dated Sep. 26, 2013 issued in corresponding European Application No. 13382135.

* cited by examiner

*Primary Examiner* — Kavel Singh
(74) *Attorney, Agent, or Firm* — Ostrolenk Faber LLP

(57) ABSTRACT

The present disclosure relates to a plastic, modular and self-engaging bristle brush (2), comprising a set of runners (6) including a pair of opposing guiding and self-centering ends projecting from the perimeter of the brush (2), said runners (6) being distributed such that the ends of runners (6) of contiguous brushes (2) can be fitted together by overlapping one another, and in that said runners (6) include at their guiding and self-centering ends articulated attachment means (7) for the articulated attachment of contiguous brushes (2) for self-engagement, turning the set of multiple brushes (2) into a cutting mat (1) which in turn forms an endless conveyor belt, said articulated attachment means in turn being provided with articulating drive shafts (8) that can engage drive elements (9) housed in multiple positions of a support table (5).

10 Claims, 8 Drawing Sheets

PLASTIC, MODULAR AND SELF-ENGAGING BRISTLE BRUSH

The present invention relates to a bristle brush, said bristle brush being a plastic, modular and self-engaging bristle brush as a whole, and said brushes allow forming a homogenous cutting mat which in turn is an endless conveyor belt.

BACKGROUND OF THE INVENTION

Plastic brushes are known today which, when duly fixed to a set of mechanical elements, form a movable, endless conveyor belt-like surface. The advantages of said brushes are the capacity to being coupled in said mechanical elements, offering the cutting and moving possibility.

There are non-coupleable plastic brushes which allow configuring stationary surfaces, not offering the advantages of continuously cutting and moving.

These plastic brushes consist of a support plate with a top surface from which a plurality of flexible bristles vertically emerges, and a bottom surface provided with coupling means for being coupled to supports, preferably metal supports.

Said supports are coupled to guiding and drive chains integral with a transmission shaft such that said chains allow moving the supports where the bristle brushes are coupled. The chains are driven by means of a set of pinions and gears for movement housed at opposite ends of the support table, which are in turn operated by means of at least one motor.

All these duly installed components allow moving the bristle brushes, forming a homogenous, flat and movable cutting surface defined by the free ends of the bristles, suitable for receiving a part to be conveyed and cut.

Nevertheless, such plastic brushes have the drawback of requiring a chassis and a set of very robust mechanical elements to enable bearing the total weight of their components, particularly the area of movement of the metal supports and the side chains, as well as motors and pinions that can drive said weight.

DESCRIPTION OF THE INVENTION

The objective of the plastic, modular and self-engaging bristle brush of the present invention is to solve the drawbacks of brushes known in the art, providing structurally simpler and more effective cutting mat that allows acting like an endless conveyor belt.

The bristle brush object of the present invention comprises a support plate with a top surface from which a plurality of flexible bristles vertically emerges, and a bottom surface provided with coupling means for coupling to drive means for driving the bristle brushes over a support table, the free ends of the bristles defining a support surface intended for receiving a part to be conveyed and cut, and it is characterized in that the coupling means of each brush comprise a set of runners emerging vertically from the bottom surface of the support plate, said runners including a pair of opposing guiding and self-centering ends projecting from the perimeter of the brush, said runners being distributed such that the ends of runners of contiguous brushes can be fitted together by overlapping one another, and in that said runners include at their guiding and self-centering ends articulated attachment means for the articulated attachment of contiguous brushes for self-engagement, turning the set of multiple brushes into a cutting mat, which in turn forms an endless conveyor belt, said articulated attachment means in turn being provided with articulating drive shafts that can engage drive elements housed in multiple positions of the support table.

The multiple function of the runners, namely the self-guiding function, the function as a sliding runner and the self-engagement function by means of the articulating drive shafts, thereby allows forming homogenous, conveyor belt-like support surfaces, eliminating the need to use various mechanical elements such as: bottom metal supports for fixing the bristle brushes, rigid supports of said bottom supports, or chains for moving the set of bristle brushes, used in the state of the art.

Therefore, said runners together with the link-like articulating drive shafts are arranged such that they form transverse chain-like anchors, forming a worm gearing geometry, preventing, as mentioned, the need for preferably metal supports and guides, as well as for supplementary guiding and drive chains known in the art, obtaining the same advantages and increasing the capacity to obtain uniform sliding.

The elimination of said unnecessary mechanical elements also allows considerably reducing the overall weight as well as the cost of manufacturing the cutting mat of the invention.

Advantageously, the articulated attachment means of the guiding and self-centering ends of each runner comprise transverse through holes, the holes of runners of contiguous brushes being able to overlap one another, such that the corresponding articulating drive shaft between rows of brushes can be introduced through said overlapping holes.

These transverse holes therefore form the guiding for the articulating drive shafts since said holes are arranged in an intercalated manner but at very short distances from one another, which allows easily threading the shaft therethrough without having to be particularly careful, this threading operation being able to be completely automated with the subsequent cost reduction.

On the other hand, the transverse holes are suitably located at the ends of the runners for the purpose of forming a gearing geometry for the drive element, which advantageously acts on these articulating drive shafts. This dual function of the articulating drive shaft makes it very stable and flexible while in operation, it being very easy to replace during maintenance tasks, without needing lubricating agents or any associated maintenance during the operation.

The use of said transverse holes together with the articulating drive shafts also allows forming a flat uniform surface formed by multiple bristle brushes without needing any bottom metal guide, as occurred with the cutting mats known in the state of the art. This simplicity results in a huge reduction in the cost, assembly time, weight and useful height necessary for forming a vacuum chamber under the support table envisaged for suction-holding the part to be cut and conveyed.

According to one embodiment of the invention, the support plate of the brushes is quadrangular or rectangular in shape, and the runners are distributed over said support plate according to a configuration defined by a first group of runners arranged on one side with respect to an axis of symmetry of the plate and a second group of runners arranged on the opposite side, such that the guiding and self-centering ends of the two runners of the first group belonging to a brush can be positioned adjacently between the two runners of the second group of a contiguous brush.

Two auxiliary runner sections arranged between the runners of the second group are preferably included, each auxiliary section being at opposite ends, and each auxiliary section being able to be positioned between the runners of the first group of a contiguous brush.

Advantageously, the brushes can be grouped together according to a parallel assembly, defining parallel rows of brushes, when the runners on one and the same side belonging to contiguous brushes are assembled facing one another.

Alternatively, the brushes can be grouped together according to an intercalated assembly, defining offset rows of brushes, when the runners of opposite sides belonging respectively to contiguous brushes are facing one another.

Said intercalated assembly allows self-centering of the bristle brushes with respect to one another without needing any supplementary mechanical element. Furthermore, attachment gaps between contiguous brushes characteristic of parallel assemblies are eliminated, thereby obtaining a regular cutting surface and homogenous movement over the entire cutting mat because stresses are regularly distributed.

On the other hand, the self-fixing of the bristle brushes in the intercalated assembly allows a quicker assembly of the entire surface of the cutting mat, forming a homogenous body. This advantage is obtained not only during the assembly phase but also in transport, maintenance, installation and all those operations in which the whole surface of the cutting mat must be handled.

Additionally, the cutting mat comprises narrower brushes envisaged for filling in the gaps formed at the lateral ends of the rows of brushes in the intercalated assembly.

Therefore, as a result of said narrower brushes it is possible to obtain straight and homogenous sides on both sides of the cutting mat, thereby preventing said cutting mat from being caught on something while the set of brushes moves.

Advantageously, the articulating drive shafts between rows of brushes are oriented perpendicular to the forward movement direction of the cutting mat such that they can engage fastenings of the drive elements in the support table.

Therefore, the support table can be much lighter and simpler because it does not have to bear the weight of unnecessary elements used in cutting mats of the state of the art, such as bottom guides, chains, supports, shafts for large pinions, etc.

Multiple drive elements in at least one end of the support table are preferably envisaged.

The duly assembled brush object of the invention allows for the configuration of a cutting mat, forming an endless conveyor belt, which advantageously allows multiple drive elements to be located along the transverse axis of said endless belt. This configuration of the drive elements enables an optimized design as said drive elements can be implemented along the entire width of the support table. This has functional advantages as it homogenously distributes the forces necessary for driving the cutting mat, allowing much smaller dimensions for one and the same total load as a result of this homogenous distribution of the stresses.

The manufacturing cost is also considerably reduced because large drive shafts are not necessary given that the diameter necessary for the rotation of the set of conveyor belt-like bristle brushes is very small, elements such as drive chains or bottom securing guides being unnecessary and replaced with self-engaging runners that have a self-guiding and self-centering function, primarily when the bristle brushes are assembled in an intercalated manner.

On the other hand, it enables the use of less powerful motors and reduction gears since the unnecessary weight of the supports, shafts, chains and guides used in the state of the art does not have to be moved, said elements being the heaviest of the entire assembly, the weight therefore being reduced to the actual weight of the bristle brushes, the drive elements and the articulating drive shafts.

Advantageously, the runners are integrated in the support plate of the bristle brush in a single plastic part.

Also advantageously, the runners include a profile with two contact surfaces envisaged for the sliding thereof over the support table.

Said areas of contact of the runners provide low-friction sliding over the support table.

BRIEF DESCRIPTION OF THE DRAWINGS

Drawings have been attached for the purpose of aiding with the foregoing description, a practical embodiment of a plastic, modular and self-engaging bristle brush object of the invention is schematically depicted only by way of non-limiting example, in which.

DESCRIPTION OF A PREFERRED EMBODIMENT

Figure 1:
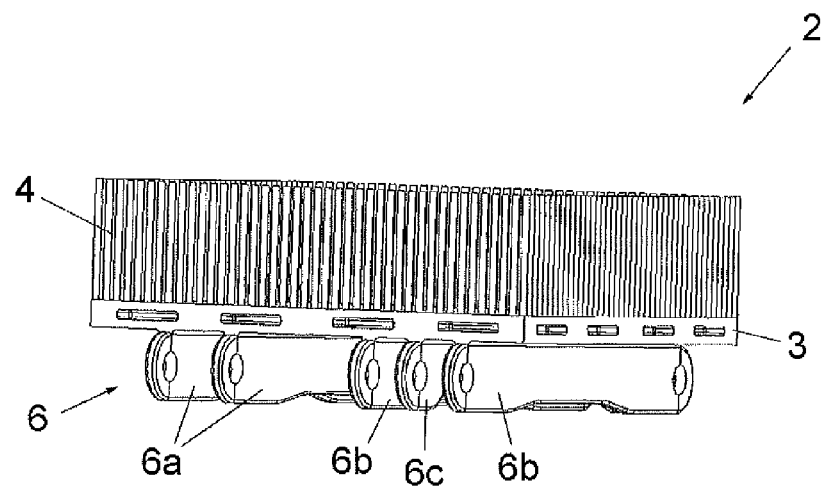
FIG. 1 is a perspective view of a bristle brush according to the invention.
Figure 2:
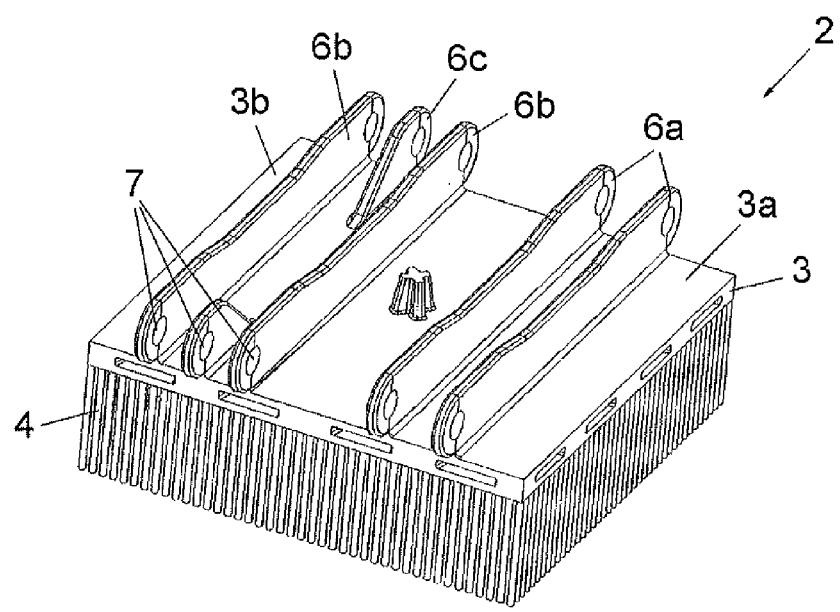
FIG. 2 is a perspective view of a bristle brush showing the runners.
Figure 14:
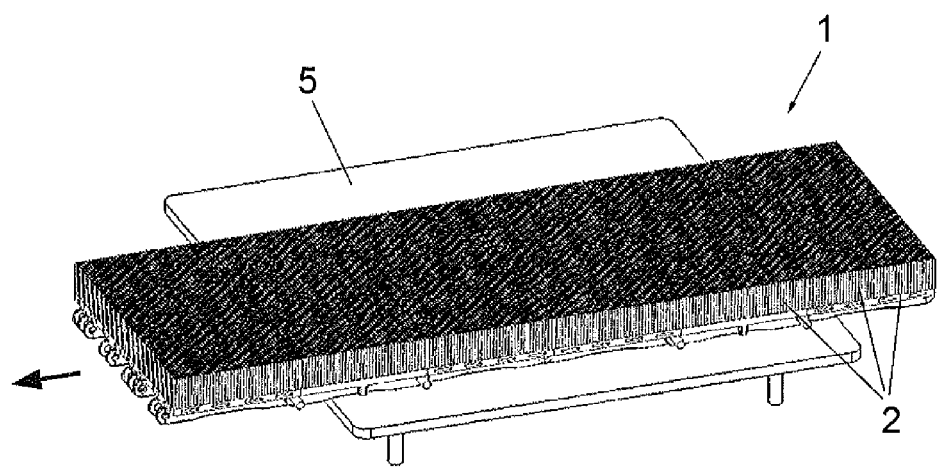
FIG. 14 is a perspective view of the cutting mat while it moves over a support table.

As can be seen in FIGS. 1, 2 and 14, the cutting mat 1 comprises a plurality of bristle brushes 2 coupled adjacently to one another according to the invention, each brush 2 including a support plate 3 with a top surface from which a plurality of flexible bristles 4 vertically emerges, and a bottom surface provided with coupling means for coupling to drive means for driving the bristle brushes 2 over a support table 5, the free ends of the bristles 4 defining a support surface intended for receiving a part to be conveyed and cut.

The coupling means of each brush 2 comprise a set of runners 6 emerging vertically from the bottom surface of the support plate 3, said runners 6 including a pair of opposing guiding and self-centering ends projecting from the perimeter of the brush 2, said runners 6 being distributed such that the ends of runners 6 of contiguous brushes 2 can be fitted together by overlapping one another.

Said runners 6 also include at their guiding and self-centering ends articulated attachment means for the articulated attachment of contiguous brushes 2 for self-engagement, turning the cutting mat 1 into an endless conveyor belt. In this case the articulated attachment means comprise transverse through holes 7.

The runners 6 are preferably integrated in the support plate 3 of the bristle brush 2 in a single plastic part.

Figure 10:
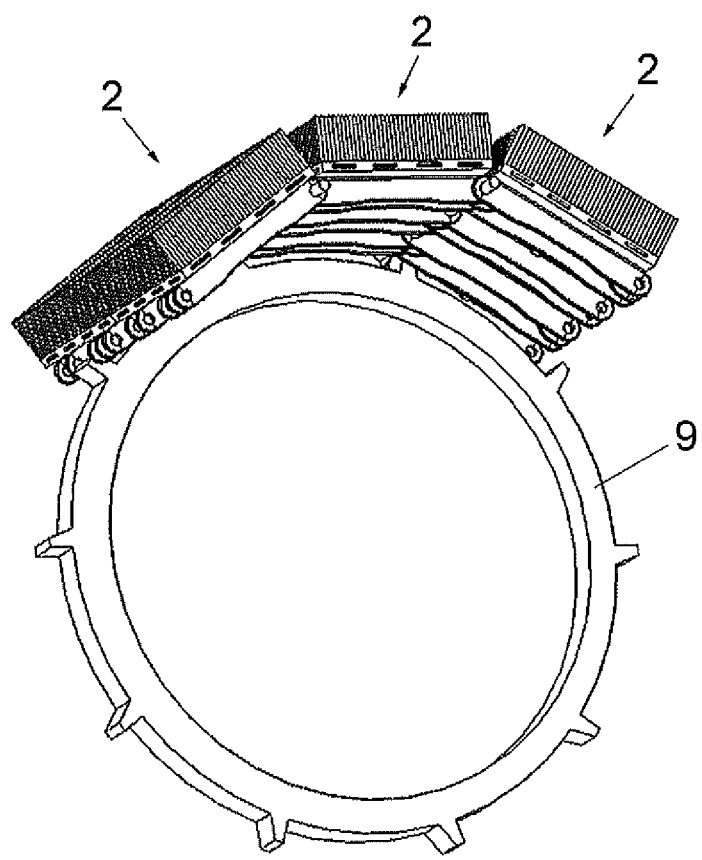
FIG. 10 is a perspective view of a possible drive element partially showing a set of bristle brushes while they engage said element.

In turn, said articulated attachment means are provided with articulating drive shafts 8 that can engage drive elements 9 of said drive means housed at the ends of the support table, as will be explained below (see FIGS. 5 and 10).

The articulating drive shafts 8 between rows of brushes 2 are oriented perpendicular to the forward movement direction (illustrated in FIG. 14 by means of an arrow) of the cutting mat 1, such that they can engage fastenings of the drive elements 9 of the support table 5.

Figure 3:
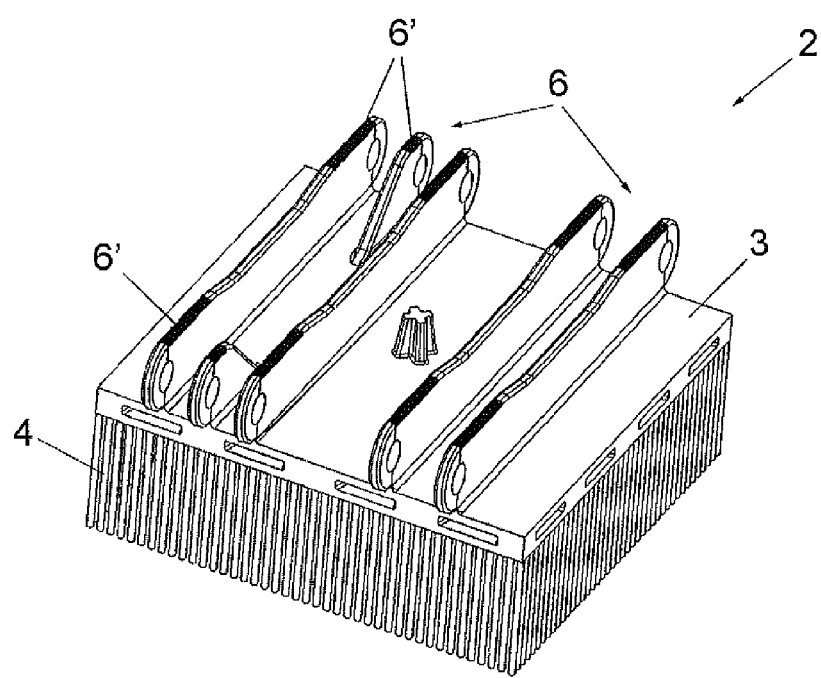
FIG. 3 is a perspective view of the bristle brush according to FIG. 2 showing the contact surfaces for the sliding thereof over the support table.

As can be seen in FIG. 3, the runners 6 include a profile with two contact surfaces 6' envisaged for the sliding thereof over the support table 5, allowing low-friction sliding.

Figure 4:
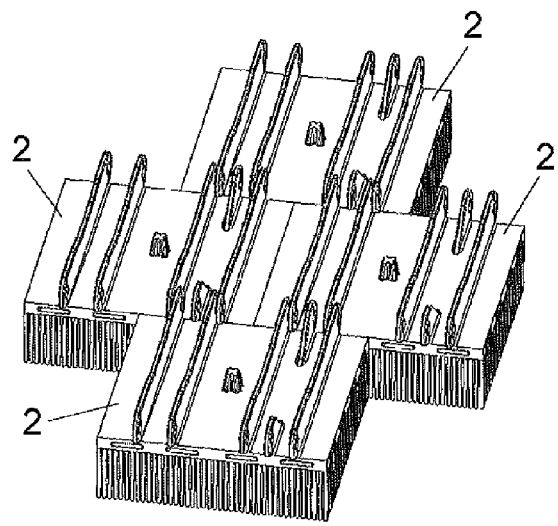
FIG. 4 is a perspective view of a set of bristle brushes coupled to one another by means of the runners allowing a lateral self-fixing.
Figure 5:
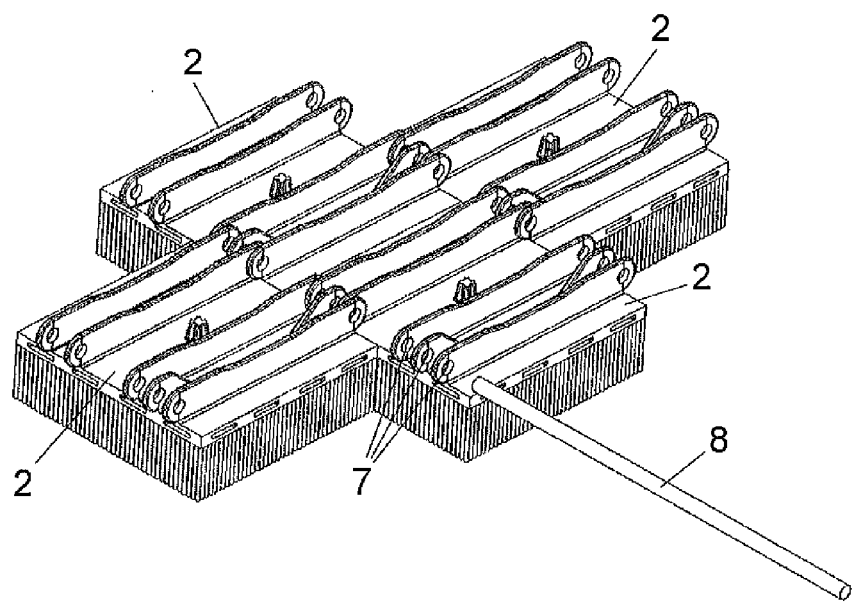
FIG. 5 is a perspective view of a set of bristle brushes coupled according to FIG. 4, showing the articulating drive shaft before being threaded through the transverse holes of the runners.

As can be observed in FIGS. 4 and 5, the holes 7 of runners 6 of contiguous brushes 2 can overlap one another, such that the corresponding articulating drive shaft 8 between rows of brushes 2 can be introduced through said overlapping holes 7.

According to a possible embodiment of the invention, the support plate 3 of the brushes 2 is quadrangular or rectangular in shape, and the runners 6 are distributed over said support plate 3 according to a configuration defined by a first group of runners 6a arranged on one side 3a with respect to an axis of symmetry of the plate 3 and a second group of runners 6b arranged on the opposite side 3b, such that the guiding and self-centering ends of the two runners 6a of the first group belonging to a brush 2 can be positioned adjacently between the two runners 6b of the second group of a contiguous brush 2.

Two auxiliary runner sections 6c arranged between two runners 6b of the second group are also included, each auxiliary section 6c being at opposite ends, and each auxiliary section 6c being able to be positioned between two runners 6a of the first group of a contiguous brush 2.

Figure 6:
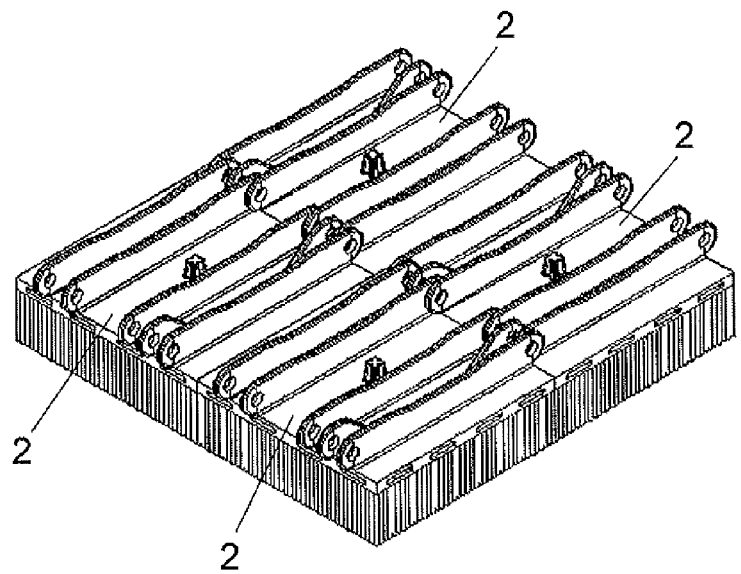
FIG. 6 is a perspective view of a set of bristle brushes coupled according to a parallel assembly.
Figure 7:
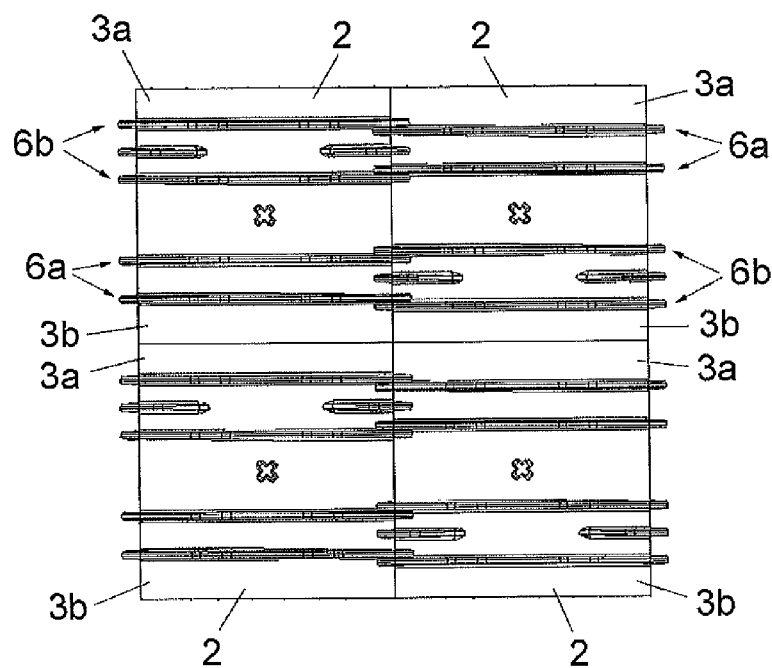
FIG. 7 is a plan view of the set of bristle brushes according to FIG. 6.

The brushes 2 can be grouped together according to a parallel assembly (see FIGS. 6 and 7), defining parallel rows of brushes when the runners 6a and 6b on one and the same side 3a or 3b belonging to contiguous brushes 2 are assembled facing one another.

Figure 8:
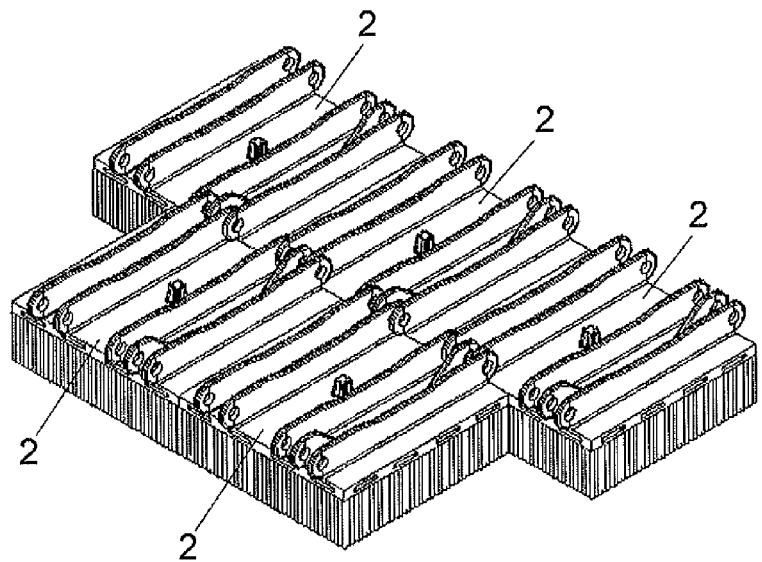
FIG. 8 is a perspective view of a set of bristle brushes coupled according to an intercalated assembly.
Figure 9:
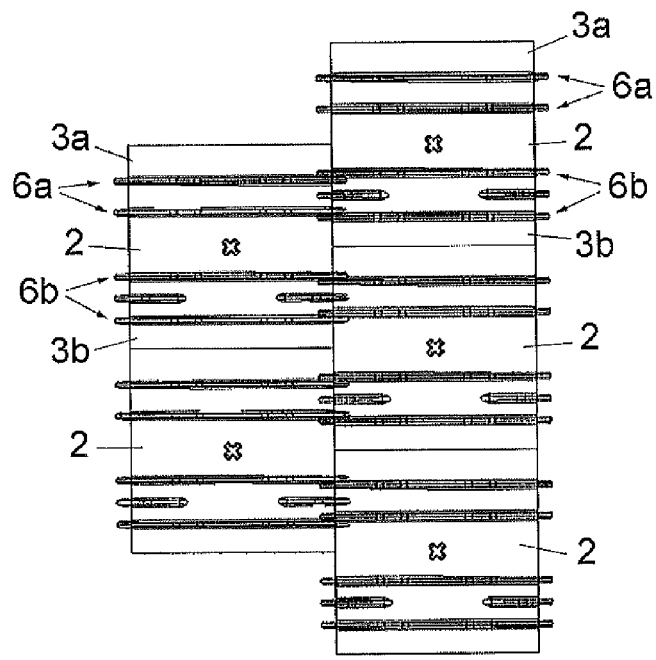
FIG. 9 is a plan view of the set of bristle brushes according to FIG. 8.

Alternatively, the brushes can be grouped together according to an intercalated assembly (see FIGS. 8 and 9), defining offset rows of brushes when the runners 6a and 6b of opposite sides 3a and 3b belonging respectively to contiguous brushes 2 are facing one another.

Figure 11:
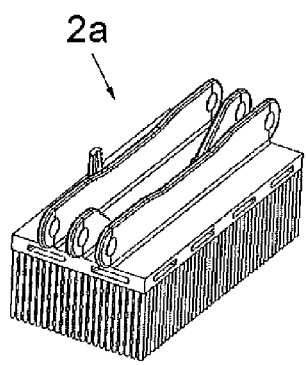
FIGS. 11 and 12 are perspective views of narrower auxiliary brushes envisaged for filling in the gaps formed at the left and right lateral ends of the cutting mat, respectively, when an intercalated assembly is used.
Figure 12:
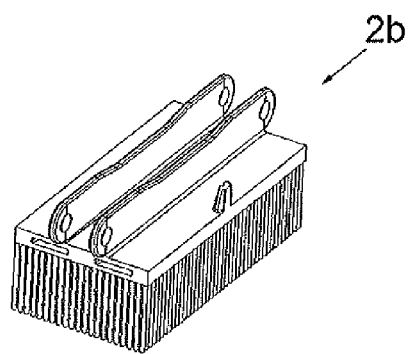
Figure 13:
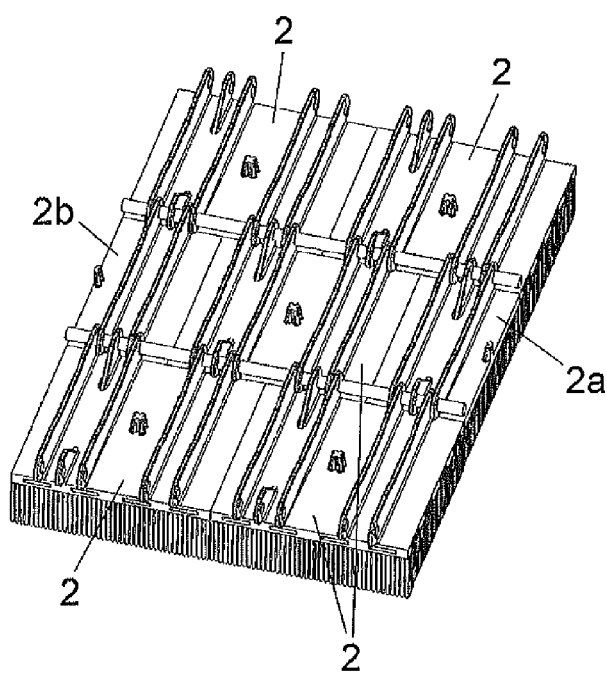
FIG. 13 is a partial perspective view of the cutting mat with an intercalated assembly showing said narrower auxiliary brushes.

Additionally, as can be seen in FIGS. 11 and 12, the cutting mat 1 comprises narrower brushes 2a, 2b envisaged for filling in the gaps formed at the lateral ends of the rows of brushes 2 in the intercalated assembly (see FIG. 13).

Despite having made reference to a specific embodiment of the invention, it is obvious for a person skilled in the art that the described plastic, modular and self-engaging bristle brush can sustain a number of variations and modifications, and all the mentioned details can be substituted with other technically equivalent details without departing from the scope of protection defined by the attached claims.

The invention claimed is:

1. A modular and self-engaging bristle brush, comprising a support plate with a top surface from which a plurality of flexible bristles vertically emerges, and a bottom surface provided with coupling for a driver that drives the bristle brush over a support table, the free ends of the bristles defining a support surface intended for receiving a part to be conveyed and cut, wherein the coupling means of the brush comprises a set of runners emerging vertically from the bottom surface of the support plate, said runners including a pair of opposing guiding and self-centering ends projecting from the perimeter of the brush only in a direction of elongation of said runners, said runners being distributed such that the ends of runners of contiguous brushes can be fitted together by overlapping one another, and in that said runners include at their guiding and self-centering ends articulated attachment to attach contiguous brushes for self-engagement, turning the set of multiple brushes into a cutting mat which in turn forms an endless conveyor belt, said articulated attachment in turn being provided with articulating drive shafts that can engage drive elements housed in multiple positions of the support table, wherein the runners are integrated in the support plate of the bristle brush in a single plastic part to form a unitary body with the support plate, and wherein the bristle brush is plastic.

2. A bristle brush according to claim 1, wherein the articulated attachment of the guiding and self-centering ends of each runner comprise transverse through holes, the holes of runners of contiguous brushes being able to overlap one another, such that the corresponding articulating drive shaft between rows of brushes can be introduced through said overlapping holes.

3. A bristle brush according to claim 1, wherein the support plate of the brushes brush is quadrangular or rectangular in shape, and wherein the runners are distributed over said support plate according to a configuration defined by a first group of runners arranged on one side with respect to an axis of symmetry of the plate and a second group of runners arranged on the opposite side, such that the guiding and self-centering ends of the two runners of the first group belonging to the brush can be positioned adjacently between the two runners of the second group of a contiguous brush.

4. A bristle brush according to claim 3, wherein two auxiliary runner sections are arranged between the runners of the second group, each auxiliary section being at opposite ends, and each auxiliary section being able to be positioned between the runners of the first group of a contiguous brush.

5. A bristle brush according to claim 3, wherein the brushes can be grouped together according to a parallel assembly, defining parallel rows of brushes when the runners on one and the same side belonging to contiguous brushes are assembled facing one another.

6. A bristle brush according to claim 3, wherein the brushes can be grouped together according to an intercalated assembly, defining offset rows of brushes when the runners of opposite sides belonging respectively to contiguous brushes are facing one another.

7. A bristle brush according to claim 6, comprising narrower brushes configured for filling in the gaps formed at the lateral ends of the rows of brushes in the intercalated assembly.

8. A bristle brush according to claim 1, wherein the articulating drive shafts between rows of brushes are oriented perpendicular to the forward movement direction of the cutting mat, such that they can engage fastenings of the drive elements in the support table.

9. A bristle brush according to claim 8, wherein multiple drive elements in at least one end of the support table are provided.

10. A bristle brush according to claim 1, wherein the runners include a profile with two contact surfaces configured for the sliding thereof over the support table.

* * * * *